(12) United States Patent
Kataoka

(10) Patent No.: US 12,024,272 B2
(45) Date of Patent: Jul. 2, 2024

(54) SHIP PROPULSION SYSTEM

(71) Applicant: SUZUKI MOTOR CORPORATION, Hamamatsu (JP)

(72) Inventor: Toshiya Kataoka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 397 days.

(21) Appl. No.: 17/510,207

(22) Filed: Oct. 25, 2021

(65) Prior Publication Data

US 2022/0126968 A1 Apr. 28, 2022

(30) Foreign Application Priority Data

Oct. 28, 2020 (JP) .................. 2020-180202

(51) Int. Cl.
*B63H 21/21* (2006.01)
*B63H 21/17* (2006.01)

(52) U.S. Cl.
CPC ............. *B63H 21/21* (2013.01); *B63H 21/17* (2013.01); *B63H 2021/216* (2013.01)

(58) Field of Classification Search
CPC .. B63H 21/00; B63H 21/17; B63H 2021/216; B63H 2020/003; B60R 2325/304; B60R 25/24; G05D 1/0206; G05D 1/048; G05D 1/0875
USPC .......................................... 440/1, 84; 701/21
See application file for complete search history.

(56) References Cited

U.S. PATENT DOCUMENTS 7,677,937 B2 * 3/2010 Ishida .................. B63H 21/213
 440/1
9,702,785 B2 * 7/2017 Fujino ................... G01M 15/05

FOREIGN PATENT DOCUMENTS

JP 2008-79060 A 4/2008

* cited by examiner

*Primary Examiner* — Daniel V Venne
(74) *Attorney, Agent, or Firm* — Stein IP, LLC

(57) ABSTRACT

A ship propulsion system includes authentication devices that respectively stores different authentication codes. Each of the authentication devices corresponds to one or more ship propulsion devices. Two or more authentication devices among the plurality of authentication devices do not simultaneously correspond to one ship propulsion device. Each of the authentication devices operates as a master authentication device when an authentication code transmitted from a communication device matches an authentication code stored in the authentication devices. The master authentication device recognizes whether a malfunction occurs in the authentication devices; and to select a ship propulsion device disposed in a manner of being bilaterally symmetrical about the center of the ship in the left-right direction from ship propulsion devices corresponding to an authentication device in which no malfunction occurs. A control device brings the ship propulsion device selected by the master authentication device into an operable state.

5 Claims, 9 Drawing Sheets

FIG. 7

|  | MALFUNCTION OCCURS IN KEYLESS UNIT 5X ONLY | MALFUNCTION OCCURS IN KEYLESS UNIT 5Y ONLY | MALFUNCTION OCCURS IN KEYLESS UNIT 5Z ONLY | MALFUNCTION OCCURS IN KEYLESS UNITS 5Y AND 5Z |
|---|---|---|---|---|
| OUTBOARD MOTOR 2A | × | ○ | ○ | ○ |
| OUTBOARD MOTOR 2B | ○ | × | × | × |
| OUTBOARD MOTOR 2C | ○ | × | × | × |

○ : SELECT  × : DO NOT SELECT

| | MALFUNCTION OCCURS IN KEYLESS UNIT 55X ONLY | MALFUNCTION OCCURS IN KEYLESS UNIT 55Y ONLY | MALFUNCTION OCCURS IN KEYLESS UNIT 55Z ONLY | MALFUNCTION OCCURS IN KEYLESS UNITS 55Y AND 55Z |
|---|---|---|---|---|
| OUTBOARD MOTOR 52A | × | ○ | ○ | ○ |
| OUTBOARD MOTOR 52B | × | ○ | ○ | ○ |
| OUTBOARD MOTOR 52C | ○ | × | × | × |
| OUTBOARD MOTOR 52D | ○ | × | × | × |
| OUTBOARD MOTOR 52E | ○ | × | × | × |
| OUTBOARD MOTOR 52F | ○ | × | × | × |

○ : SELECT    × : DO NOT SELECT

SHIP PROPULSION SYSTEM

CROSS-REFERENCE TO RELATED APPLICATIONS

The disclosure of Japanese Patent Application No. 2020-180202 filed on Oct. 28, 2020, including specification, drawings and claims is incorporated herein by reference in its entirety.

BACKGROUND

The present invention relates to a ship propulsion system adopting a keyless system.

A method of starting an outboard motor provided in a ship includes a method using a mechanical key in the related art. The method using a mechanical key is a method in which a power supply of the outboard motor is turned on or a power source of the outboard motor is started by inserting a key into a key link and rotating the key.

On the other hand, a ship propulsion system adopting a keyless system has been increasing recently. The keyless system is a system in which an outboard motor is started without using a mechanical key, and for example, an authentication code is wirelessly transmitted from a small communication device that can be carried by a user to an authentication device provided in a ship or an outboard motor, the authentication device determines whether the authentication code transmitted from the communication device is correct, and when the authentication code is a correct authentication code, the outboard motor is brought into an operable state.

A keyless ship propulsion system includes an outboard motor, a control device such as an engine control module (ECM) configured to control the outboard motor, the authentication device, and the communication device. In the keyless ship propulsion system, an authentication code is stored in each of the communication device and the authentication device. The communication device wirelessly transmits the authentication code stored in the communication device to the authentication device. The authentication device compares the authentication code transmitted from the communication device with the authentication code stored in the authentication device, and determines that the authentication code transmitted from the communication device is correct when the two authentication codes match with each other. The authentication device is communicably connected to the control device via a cable. The control device also has a function of locking the outboard motor and bringing the outboard motor into an inoperable state. When it is determined that the authentication code transmitted from the communication device is correct, the authentication device transmits an unlock instruction for unlocking the outboard motor to the control device. The control device unlocks the outboard motor and brings the outboard motor into an operable state, in accordance with the unlock instruction.

Patent Literature 1 listed below describes a general technique related to the keyless system.

Patent Literature 1: JP-A-2008-79060

SUMMARY

According to one advantageous aspect of the present invention, there is provided a ship propulsion system including:

a plurality of ship propulsion devices provided in a ship and configured to propel the ship;

a control device configured to control the plurality of ship propulsion devices;

a plurality of authentication devices that respectively stores different authentication codes; and a communication device storing one of the authentication codes respectively stored in the plurality of authentication devices and configured to transmit the one of the authentication codes to the plurality of authentication devices, in which the plurality of ship propulsion devices include three or more ship propulsion devices, the plurality of ship propulsion devices are disposed in a manner of being bilaterally symmetrical about a center the ship in a left-right direction, each of the authentication devices corresponds to one or more ship propulsion devices among the plurality of ship propulsion devices, two or more authentication devices among the plurality of authentication devices do not simultaneously correspond to one ship propulsion device of the plurality of ship propulsion devices, each of the authentication devices is configured to operate as a master authentication device when an authentication code transmitted from the communication device matches an authentication code stored in the authentication devices, the master authentication device is configured: to recognize whether a malfunction occurs in each of the authentication devices; and to select a ship propulsion device disposed in a manner of being bilaterally symmetrical about the center of the ship in the left-right direction from ship propulsion devices corresponding to an authentication device in which no malfunction occurs among the plurality of authentication devices, and the control device is configured to bring the ship propulsion device selected by the master authentication device into an operable state.

BRIEF DESCRIPTION OF DRAWINGS

FIG. 7 is a diagram showing an example of outboard motor selection information of the ship propulsion system according to the first embodiment of the present invention.

FIG. 9 is a diagram showing an example of outboard motor selection information of the ship propulsion system according to the second embodiment of the present invention.

DETAILED DESCRIPTION OF EXEMPLIFIED EMBODIMENTS

Figure 1:
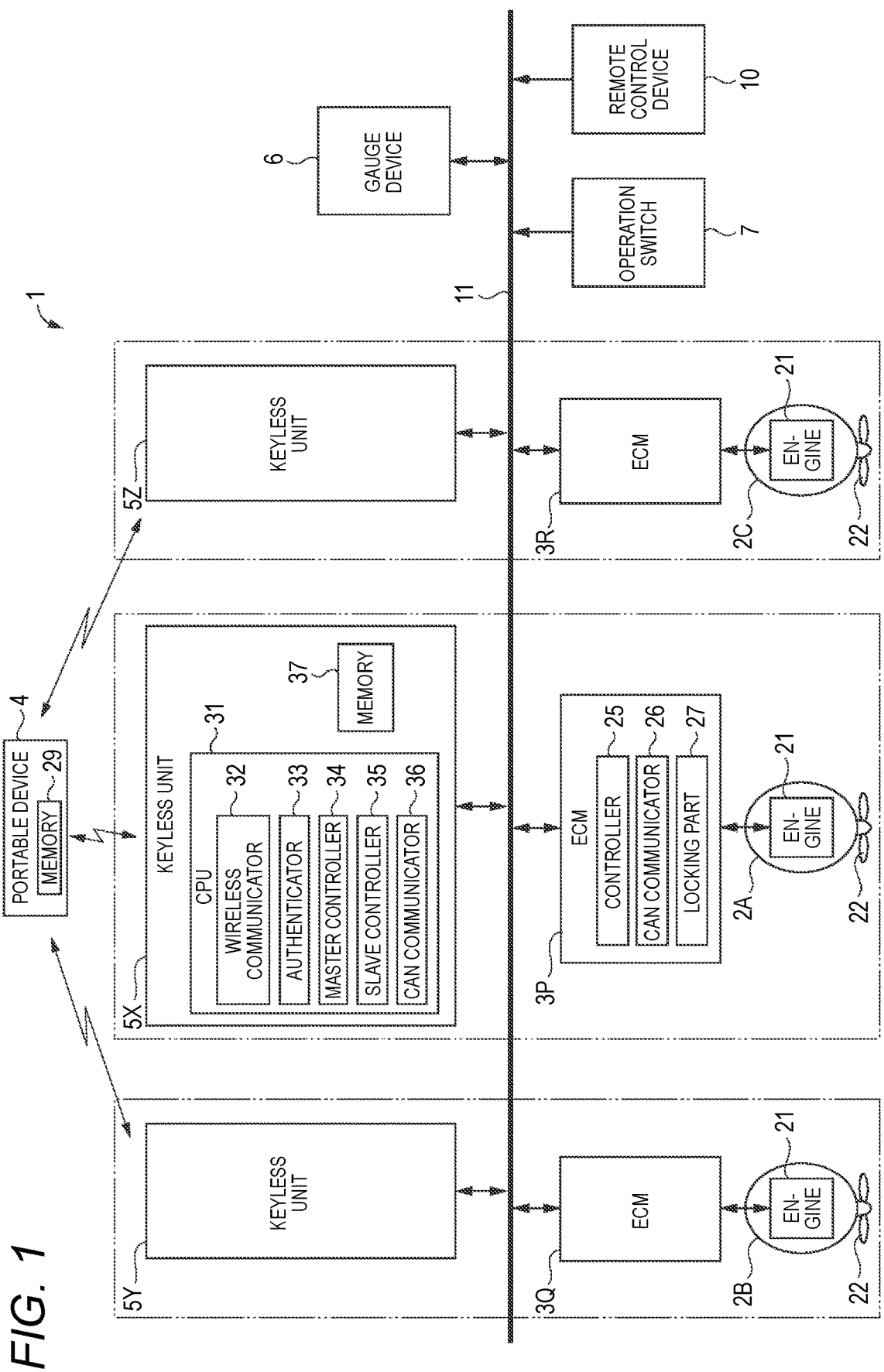
FIG. 1 is a block diagram showing a configuration of a ship propulsion system according to a first embodiment of the present invention.

In the case of adopting a keyless system for one ship to which a plurality of outboard motors are attached, that is, a ship to which multiple outboard motors are mounted, a plurality of authentication devices respectively corresponding to the plurality of outboard motors attached to the ship may be provided in the ship. In this case, the ship propulsion system includes a plurality of outboard motors, a plurality of control devices respectively corresponding to the plurality of outboard motors, a plurality of authentication devices respectively corresponding to the plurality of outboard motors, and a plurality of communication devices respectively corresponding to the plurality of authentication devices.

Recently, there has been developed a ship propulsion system adopting a method in which one authentication device among a plurality of authentication devices is operated as a master authentication device, the other authentication devices are operated as slave authentication devices, when the master authentication device determines that an authentication code transmitted from the communication device is correct, the master authentication device unlocks an outboard motor corresponding to the master authentication device, and an unlock request is transmitted from the master authentication device to a slave authentication device to cause the slave authentication device to unlock an outboard motor corresponding to the slave authentication device. In the case of such a ship propulsion system, the plurality of outboard motors can be unlocked all at once by using one communication device.

In a keyless ship propulsion system for a ship to which a plurality of outboard motors are mounted, redundancy of the ship propulsion system can be improved by providing a plurality of authentication devices respectively corresponding to the plurality of outboard motors attached to the ship. That is, a plurality of authentication devices respectively corresponding to the plurality of outboard motors attached to the ship are provided, so that even when a malfunction (for example, a failure) occurs in some of the plurality of authentication devices and an outboard motor corresponding to an authentication device in which a malfunction occurs cannot be unlocked, an outboard motor corresponding to another authentication device in which no malfunction occurs can be unlocked and the outboard motor can be operated. Accordingly, the ship can be propelled.

However, a ship propulsion system including a plurality of authentication devices as described above has the following problems. That is, in a case where a malfunction occurs in some of the plurality of authentication devices, an outboard motor corresponding to an authentication device in which a malfunction occurs cannot be unlocked, an outboard motor corresponding to another authentication device in which no malfunction occurs is unlocked, and the unlocked outboard motor is operated to propel the ship, a propulsive force of the ship obtained from the operated outboard motor may not be balanced at the left and right sides, and it is difficult for a user to maneuver the ship. For example, in a case where a ship is provided with three outboard motors, an outboard motor disposed at a left side of the ship cannot be unlocked due to a malfunction of some of the authentication devices, an outboard motor disposed at the center of the ship in the left-right direction is unlocked and an outboard motor disposed at a right side of the ship is unlocked, and the unlocked two outboard motors propel the ship, a propulsive force of the ship is biased to the right side of the ship, and a blow tends to turn to the left when the ship moves forward. As a result, it is difficult for a user to move the ship straight or turn the ship to the right by a usual operation.

The present invention has been made in view of, for example, the problems described above, and an object of the present invention is to provide a ship propulsion system that enables easy ship maneuvering for a ship provided with three or more ship propulsion devices even in a case where some ship propulsion devices cannot be brought into an operable state due to a malfunction of a device for implementing a keyless system, such as an authentication device.

A ship propulsion system according to an embodiment of the present invention includes a plurality of ship propulsion devices provided in a ship, a control device configured to control the plurality of ship propulsion devices, a plurality of authentication devices, and a communication device.

The number of the ship propulsion devices in the ship propulsion system is three or more. The plurality of ship propulsion devices are disposed in a manner of being bilaterally symmetrical about the center of the ship in a left-right direction. Specifically, when the number of the ship propulsion devices is an odd number, one ship propulsion device is disposed at the center of the ship in the left-right direction, and the same number of ship propulsion devices are respectively disposed at left and right sides of the ship. When viewed as a whole, the plurality of ship propulsion devices are disposed in a manner of being bilaterally symmetrical about the center of the ship in the left-right direction. When the number of ship propulsion devices is an even number, the same number of ship propulsion devices are respectively disposed at the left and right sides of the ship in a manner of being bilaterally symmetrical about the center of the ship in the left-right direction. A type of a power source of the ship propulsion device is not limited. The power source of the ship propulsion device may be an engine such as an internal combustion engine or an electric motor.

As for the control device, the control devices of the same number as the number of the ship propulsion devices may be provided, and the ship propulsion devices and the control devices may correspond to each other on a one-to-one basis, or a single control device configured to comprehensively control the plurality of ship propulsion devices in the ship propulsion system may be provided. For example, the control device may be an ECM provided in each of the ship propulsion devices, or may be a single boat control module (BCM) provided in the ship.

For the authentication device, a plurality of authentication devices of the same number as the number of the ship propulsion devices may be provided, or a plurality of authentication devices may be provided in a manner in which the number of authentication devices is less than the number of the ship propulsion devices. In a case where the number of the authentication devices is the same as the number of the ship propulsion devices, the ship propulsion devices and the authentication devices correspond to each other on a one-to-one basis. For example, in a case where three ship propulsion devices are provided in the ship, three authentication devices are provided and one ship propulsion device corresponds to one authentication device. On the other hand, in a case where the number of the authentication devices is less than the number of the ship propulsion devices, two or more ship propulsion devices correspond to each of the plurality of authentication devices or correspond to some of the plurality of authentication devices. For example, in a case where six ship propulsion devices are provided in the ship, three authentication devices are provided and two ship propulsion devices correspond to one authentication device. In addition, in a case where six ship propulsion devices are provided in the ship, three authentication devices may be provided. Among the three authentication devices, four ship propulsion devices that are disposed in a central region of the ship in the left-right direction may correspond to one authentication device, one ship propulsion device disposed at the leftmost side of the ship may correspond to one authentication device, and one ship propulsion device disposed at the rightmost side of the ship may correspond to the remaining one authentication device.

Each authentication device corresponds to one or more ship propulsion devices among the plurality of ship propulsion devices, but two or more authentication devices among the plurality of authentication devices do not simultaneously correspond to one ship propulsion device among the plurality of ship propulsion devices. Different authentication codes are respectively stored in the plurality of authentication devices.

The communication device is, for example, a portable small wireless communication device. The number of communication devices may be one. The communication device stores one of the authentication codes respectively stored in the plurality of authentication devices.

The communication device transmits the authentication code stored in the communication device to each authentication device. An authentication device is operated as a master authentication device when the authentication code transmitted from the communication device matches the authentication code stored in the authentication device.

The master authentication device recognizes whether a malfunction occurs in each authentication device. Then, the master authentication device selects a ship propulsion device that is disposed in a manner of being bilaterally symmetrical about the center of the ship in the left-right direction from the ship propulsion devices corresponding to an authentication device in which no malfunction occurs among the plurality of authentication devices. The control device brings the ship propulsion device selected by the master authentication device into an operable state.

A user can operate only the ship propulsion device in an operable state as described above, that is, the ship propulsion device selected by the master authentication device. When the user operates the ship propulsion device, a propulsive force of the ship is balanced between the right and left sides. As described above, according to the ship propulsion system in the embodiment of the present invention, even when a malfunction occurs in some of the authentication devices, the balance between the left and right sides of the propulsive force of the ship obtained from the ship propulsion devices can be maintained. Therefore, the user can easily maneuver the ship.

First Embodiment (Ship Propulsion System)

Figure 2:
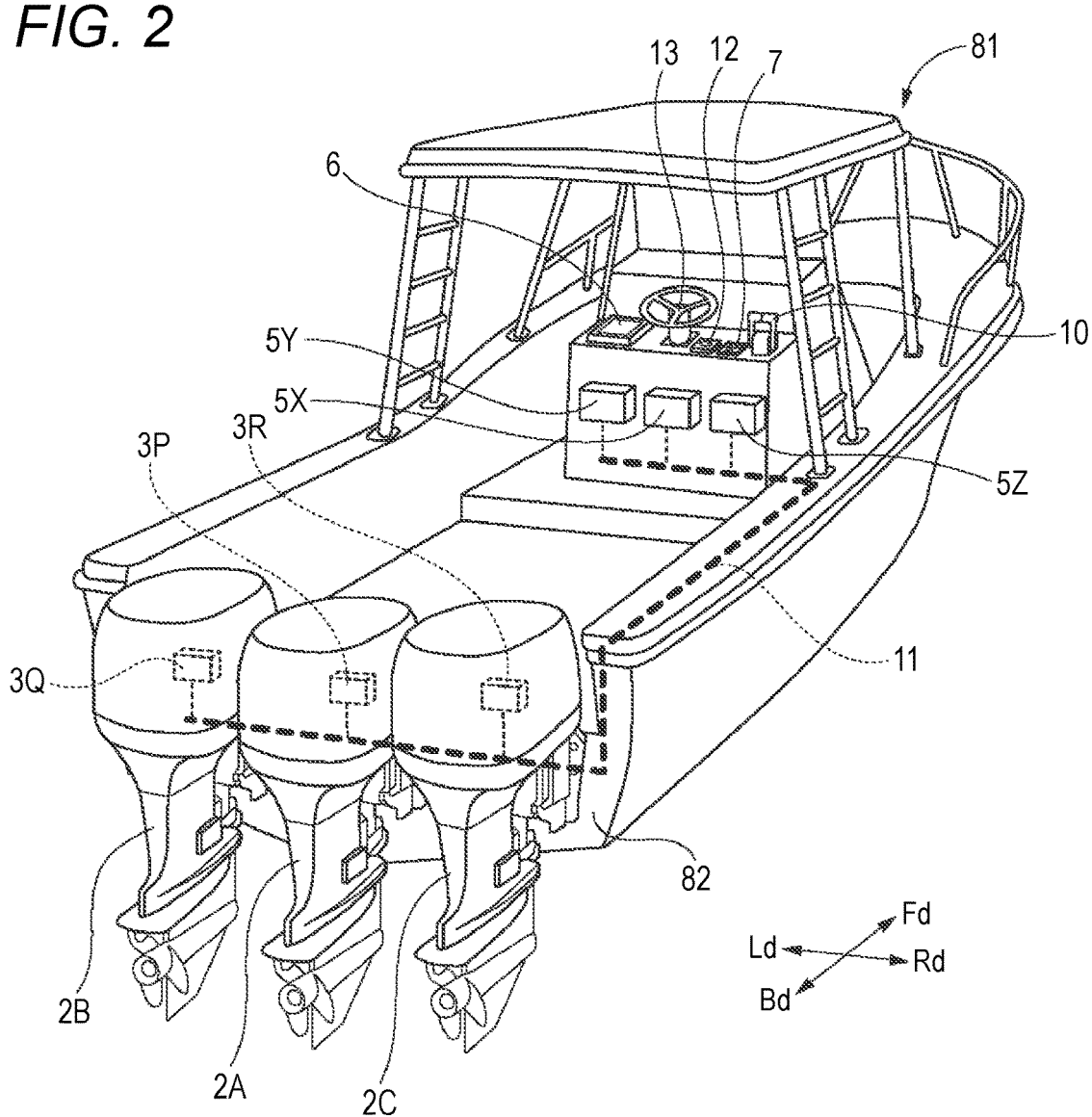
FIG. 2 is a perspective view showing a ship to which the ship propulsion system according to the first embodiment of the present invention is applied, as viewed from an upper right rear side.
Figure 3:
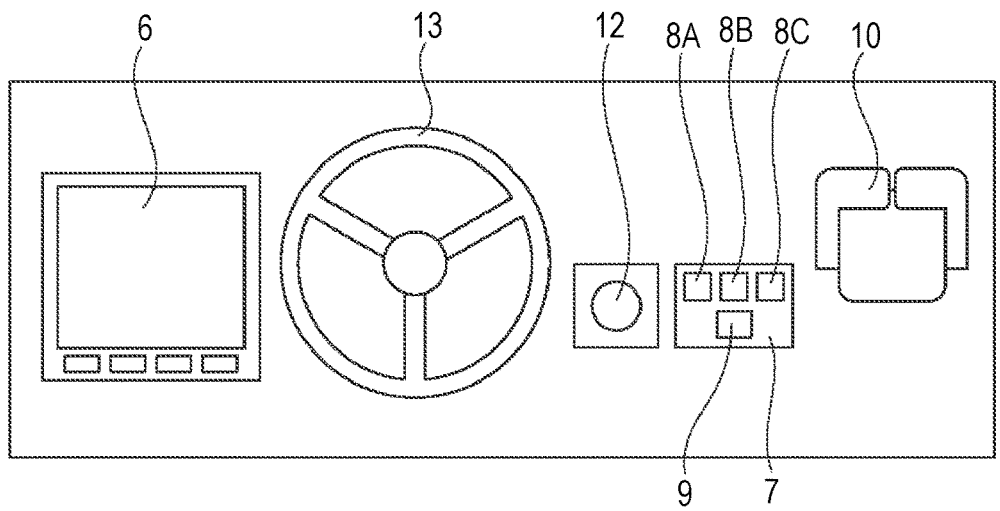
FIG. 3 is a diagram showing a cockpit of the ship in FIG. 2.

FIG. 1 shows a configuration of a ship propulsion system 1 according to a first embodiment of the present invention. FIG. 2 shows a ship 81 to which the ship propulsion system 1 is applied. Arrows at a lower left side in FIG. 2 indicate directions of front (Fd), rear (Bd), left (Ld), and right (Rd) of the ship 81. FIG. 3 shows a cockpit of the ship 81. A case where an outboard motor is used as a representative example of the ship propulsion device is described in the embodiment of the present invention.

The ship propulsion system 1 is a system that controls the propulsion of the ship 81. The ship propulsion system 1 adopts a keyless system. As shown in FIG. 1, the ship propulsion system 1 includes outboard motors 2A, 2B, and 2C serving as a plurality of ship propulsion devices, a plurality of ECMs 3P, 3Q, and 3R serving as control devices, a portable device 4 serving as a communication device, keyless units 5X, 5Y, and 5Z serving as a plurality of authentication devices, a gauge device 6, an operation switch 7, and a remote control device 10. Hereinafter, the remote control device is referred to as a "remote controller".

The outboard motors 2A, 2B, and 2C are devices that propel the ship 81. Each of the outboard motors 2A, 2B, and 2C includes an engine 21 that is an internal combustion engine serving as a power source, a propeller 22 that converts power of the engine 21 into a propulsive force, and the like. The ship propulsion system 1 according to the present embodiment includes three outboard motors 2A, 2B, and 2C. As shown in FIG. 2, three outboard motors are mounted on the ship 81. That is, the three outboard motors 2A, 2B, and 2C are attached to a transom 82 of the ship 81.

The three outboard motors 2A, 2B, and 2C are disposed bilaterally symmetrical about the center of the ship 81 in the left-right direction. The outboard motor 2A is disposed at the center of the ship 81 in the left-right direction, the outboard motor 2B is disposed at a left side of the ship 81, and the outboard motor 2C is disposed at a right side of the ship 81. Performance (for example, maximum outputs) related to an output of the engine 21 of each of the outboard motors 2A, 2B, and 2C is the same.

The ECMs 3P, 3Q, and 3R are devices that control the outboard motors 2A, 2B, and 2C. The ship propulsion system 1 according to the present embodiment includes three ECMs 3P, 3Q, and 3R. The three ECMs 3P, 3Q, 3R respectively correspond to the three outboard motors 2A, 2B, 2C. Each of the ECMs 3P, 3Q, and 3R controls a corresponding outboard motor. As shown in FIG. 2, the ECMs 3P, 3Q, and 3R are respectively attached to corresponding outboard motors.

Each of the ECMs 3P, 3Q, and 3R includes a Central Processing Unit (CPU), a memory, a communication circuit, and the like. As shown in FIG. 1, the CPU of each of the ECMs 3P, 3Q, and 3R functions as a controller 25, a controller area network (CAN) communication unit 26, and a locking part 27 in accordance with a program stored in the memory. In FIG. 1, the controller 25, the CAN communicator 26, and the locking part 27 are shown for the ECM 3P only, and are not shown for the ECMs 3Q and 3R.

The controller 25 executes various processings related to the control of the outboard motors. The CAN communicator 26 performs CAN communication with other devices provided in the ship 81 via a shared signal line 11. That is, in the ship propulsion system 1 according to the present embodiment, devices provided in the ship 81, specifically, the plurality of ECMs 3P, 3Q, and 3R, the plurality of keyless units 5X, 5Y, and 5Z, the gauge device 6, the operation switch 7, the remote controller 10, and the like are connected to the shared signal line 11, and communication can be performed via the shared signal line 11. CAN is adopted as a communication method among these devices. The shared signal line 11 is a path for performing CAN communication.

The locking part 27 locks and unlocks a corresponding outboard motor. Even after a power supply of an outboard motor is turned on, in a case where the outboard motor is locked by the locking part 27, the outboard motor cannot be operated. Specifically, when an outboard motor is locked, a user cannot operate the engine 21 of the outboard motor even when the user presses an individual start and stop switch 8A, 8B, or 8C corresponding to the outboard motor or presses an all-device start and stop switch 9. On the other hand, when the locking part 27 unlocks an outboard motor after a power supply of the outboard motor is turned on, the outboard motor can be operated. That is, when an outboard motor is unlocked, the user can start the engine 21 of the outboard motor by pressing the individual start and stop switch 8A, 8B, or 8C corresponding to the outboard motor or pressing the all-device start and stop switch 9.

The portable device 4 is a device that performs wireless communication with the keyless units 5X, 5Y, and 5Z and transmits an authentication code to the keyless units 5X, 5Y, and 5Z. The portable device 4 is a small short-range wireless communication device that can be easily carried by a user. The portable device 4 includes a small CPU for executing a communication control, a memory 29, a communication circuit for executing short-range wireless communication, and the like. A single authentication code is stored in the memory 29 of the portable device 4. The portable device 4 transmits the authentication code stored in the memory 29 to the keyless units 5X, 5Y, and 5Z.

The keyless units 5X, 5Y, and 5Z are devices that unlock the outboard motors 2A, 2B, and 2C based on the authentication code transmitted from the portable device 4. The ship propulsion system 1 according to the present embodiment includes three keyless units 5X, 5Y, and 5Z. As shown in FIG. 2, the keyless units 5X, 5Y, and 5Z are disposed in the vicinity of the cockpit of the ship 81. The three keyless units 5X, 5Y, and 5Z respectively correspond to the three outboard motors 2A, 2B, and 2C. In FIG. 1, an outboard motor, an ECM, and a keyless unit corresponding to one another are surrounded by a two-dot chain line. That is, the outboard motor 2A, the ECM 3P, and the keyless unit 5X correspond to one another. The outboard motor 2B, the ECM 3Q, and the keyless unit 5Y correspond to one another. The outboard motor 2C, the ECM 3R, and the keyless unit 5Z correspond to one another. The keyless units 5X, 5Y, and 5Z correspond to devices for implementing a keyless system.

Each of the keyless units 5X, 5Y, and 5Z can unlock a corresponding outboard motor. That is, the keyless unit 5X can unlock the outboard motor 2A. Specifically, the keyless unit 5X transmits an unlock signal to the ECM 3P. The locking part 27 of the ECM 3P unlocks the outboard motor 2A in accordance with the unlock signal transmitted from the keyless unit 5X. Similarly, the keyless unit 5Y can unlock the outboard motor 2B, and the keyless unit 5Z can unlock the outboard motor 2C. The unlock signal is a signal for unlocking an outboard motor, and is a specific example of an unlock instruction.

The keyless units 5X, 5Y, and 5Z have a master-slave function. Here, the master-slave function refers to a function of locking the three outboard motors 2A, 2B, and 2C all at once based on a single authentication code transmitted from one portable device 4 by making the keyless units 5X, 5Y, and 5Z cooperate with one another in such a manner that one of the keyless units 5X, 5Y, and 5Z is operated in a leading manner as a master keyless unit and the remaining two keyless units are operated in a subordinate manner as slave keyless units. To describe the master-slave function in detail, the keyless units 5X, 5Y, and 5Z store different authentication codes. One of the authentication codes stored in the keyless units 5X, 5Y, and 5Z is stored in the memory 29 of the portable device 4. First, each of the keyless units 5X, 5Y, and 5Z receives an authentication code transmitted from the portable device 4. Next, each of the keyless units 5X, 5Y, and 5Z starts to be operated as a master keyless unit when the authentication code transmitted from the portable device 4 matches the authentication code stored in each of the keyless units 5X, 5Y, and 5Z, and starts to be operated as a slave keyless unit when the authentication code transmitted from the portable device 4 does not match the authentication code stored in each of the keyless units 5X, 5Y, and 5Z. Next, in a case where no malfunction (for example, a failure) occurs in all of the keyless units 5X, 5Y, and 5Z and all of the keyless units 5X, 5Y, and 5Z are operated normally, the master keyless unit transmits an unlock signal to an ECM corresponding to the master keyless unit to unlock an outboard motor corresponding to the master keyless unit, and transmits an unlock request to each slave keyless unit. Next, each slave keyless unit receives the unlock request transmitted from the master keyless unit, transmits an unlock signal to an ECM corresponding to the slave keyless unit in accordance with the received unlock request, and unlocks an outboard motor corresponding to the slave keyless unit.

The keyless units 5X, 5Y, and 5Z have an outboard motor selection function. The outboard motor selection function is a function in which the master keyless unit recognizes whether a malfunction (for example, a failure) occurs in each keyless unit, selects an outboard motor that is disposed in a manner of being bilaterally symmetrical about the center of the ship 81 in the left-right direction from outboard motors corresponding to a keyless unit in which no malfunction occurs, and executes a control such that only the selected outboard motor is unlocked. For the keyless units 5X, 5Y, and 5Z according to the present embodiment, a method for the master keyless unit to recognize whether a malfunction occurs in a slave keyless unit adopts a method in which the slave keyless unit diagnoses whether a malfunction occurs in the slave keyless unit, transmits diagnosis information indicating a diagnosis result to the master keyless unit, and the master keyless unit recognizes whether a malfunction occurs in the slave keyless unit based on the diagnosis information transmitted from the slave keyless unit.

Each of the keyless units 5X, 5Y, and 5Z includes a CPU 31, a memory 37, a communication circuit, and the like. The respective memories 37 of the keyless units 5X, 5Y, and 5Z store different authentication codes. One of the authentication codes stored in the respective memories 37 of the keyless units 5X, 5Y, and 5Z is the same as the authentication code stored in the memory 29 of the portable device 4.

The CPU 31 of each of the keyless units 5X, 5Y, and 5Z functions as a wireless communicator 32, an authenticator 33, a master controller 34, a slave controller 35, and a CAN communicator 36 in accordance with a program stored in the memory 37. In FIG. 1, the CPU 31, the wireless communicator 32, the authenticator 33, the master controller 34, the slave controller 35, the CAN communicator 36, and the memory 37 are shown for the keyless unit 5 only, and are not shown for the keyless units 5Y and 5Z.

In each of the keyless units 5X, 5Y, and 5Z, the wireless communicator 32 executes short-range wireless communication with the portable device 4, and receives an authentication code transmitted from the portable device 4.

The authenticator 33 determines whether the authentication code transmitted from the portable device 4 matches the authentication code stored in the memory 37.

When the authentication code transmitted from the portable device 4 matches the authentication code stored in the memory 37, the master controller 34 operates the keyless unit as a master keyless unit. As will be described later, the keyless unit that is operated as a master keyless unit recognizes whether a malfunction occurs in a slave keyless unit, selects an outboard motor, and the like.

When the authentication code transmitted from the portable device 4 does not match the authentication code stored in the memory 37, the slave controller 35 operates the keyless unit as a slave keyless unit. As will be described later, the keyless unit that is operated as the slave keyless unit diagnoses whether a malfunction occurs in the keyless unit.

The CAN communicator 36 transmits an unlock signal to a corresponding outboard motor via the shared signal line 11. When a keyless unit is operated as a master keyless unit, the CAN communicator 36 transmits an unlock request to a slave keyless unit via the shared signal line 11. When a keyless unit is operated as a slave keyless unit, the CAN communicator 36 transmits diagnosis information to a master keyless unit via the shared signal line 11.

As shown in FIG. 3, the gauge device 6, the operation switch 7, and the remote controller 10 are disposed in a cockpit of the ship 81. The gauge device 6 is a device that displays various kinds of information related to the ship and the outboard motors, such as a state of the engine 21 of each of the outboard motors 2A, 2B, and 2C and a remaining fuel amount. For example, the gauge device 6 can communicate with the ECMs 3P, 3Q, and 3R via the shared signal line 11, can acquire information such as a rotation speed of the engine 21 of each of the outboard motors 2A, 2B, and 2C from the ECMs 3P, 3Q, and 3R, and can display the information. As will be described later, the gauge device 6 has a function of inputting an authentication code. The gauge device 6 includes a display for displaying information and an operation button for inputting an authentication code. The operation button may be implemented by a touch panel.

The operation switch 7 is provided with three individual start and stop switches 8A, 8B, and 8C and an all-device start and stop switch 9. The individual start and stop switches 8A, 8B, and 8C are switches for individually operating the start and stop of the engine 21 of each of the outboard motors 2A, 2B, and 2C. The individual start and stop switches 8A, 8B, and 8C correspond to the outboard motor 2A, 2B, and 2C on a one-to-one basis. For example, when a user presses the individual start and stop switch 8A, an engine start and stop signal is transmitted, via the shared signal line 11, from the operation switch 7 to the ECM 3P that controls the outboard motor 2A corresponding to the individual start and stop switch 8A. The all-device start and stop switch 9 is a switch for simultaneously starting or stopping the engines 21 of the outboard motors 2A, 2B, and 2C. When the user presses the all-device start and stop switch 9, engine start and stop signals are transmitted, via the shared signal line 11, from the operation switch 7 to the ECMs 3P, 3Q, and 3R that control the outboard motors 2A, 2B, and 2C.

When the engine 21 of an outboard motor corresponding to an ECM that received the engine start and stop signal is stopped and the outboard motor is unlocked, the ECM starts the engine 21 of the outboard motor. When the engine 21 of an outboard motor corresponding to an ECM that received the engine start and stop signal is operating, the ECM stops the engine 21 of the outboard motor.

The remote controller 10 is a device that performs shift switching (switching between a forward movement, a neutral movement, and a reverse movement) of the outboard motors 2A, 2B, and 2C, adjustment of a rotation speed (a speed of the ship 81) of the engine 21 of each of the outboard motors 2A, 2B, and 2C, and the like. For example, when a user operates a lever of the remote controller 10 to perform shift switching, a shift switching signal is transmitted via the shared signal line 11 to an ECM that controls an outboard motor assigned to the lever at that time.

The cockpit of the ship 81 is provided with a main switch 12. The main switch 12 has a function as a main power switch for turning on or turning off power supplies of devices provided in the ship 81, that is, the outboard motors 2A, 2B, and 2C, the ECMs 3P, 3Q, and 3R, the keyless units 5X, 5Y, and 5Z, the gauge device 6, the operation switch 7, the remote controller 10, and the like. Further, a steering device 13 (only a steering wheel is shown) is provided in the cockpit of the ship 81. The steering device 13 is a device that steers the ship 81.

(Unlocking Processing)

Figure 4:
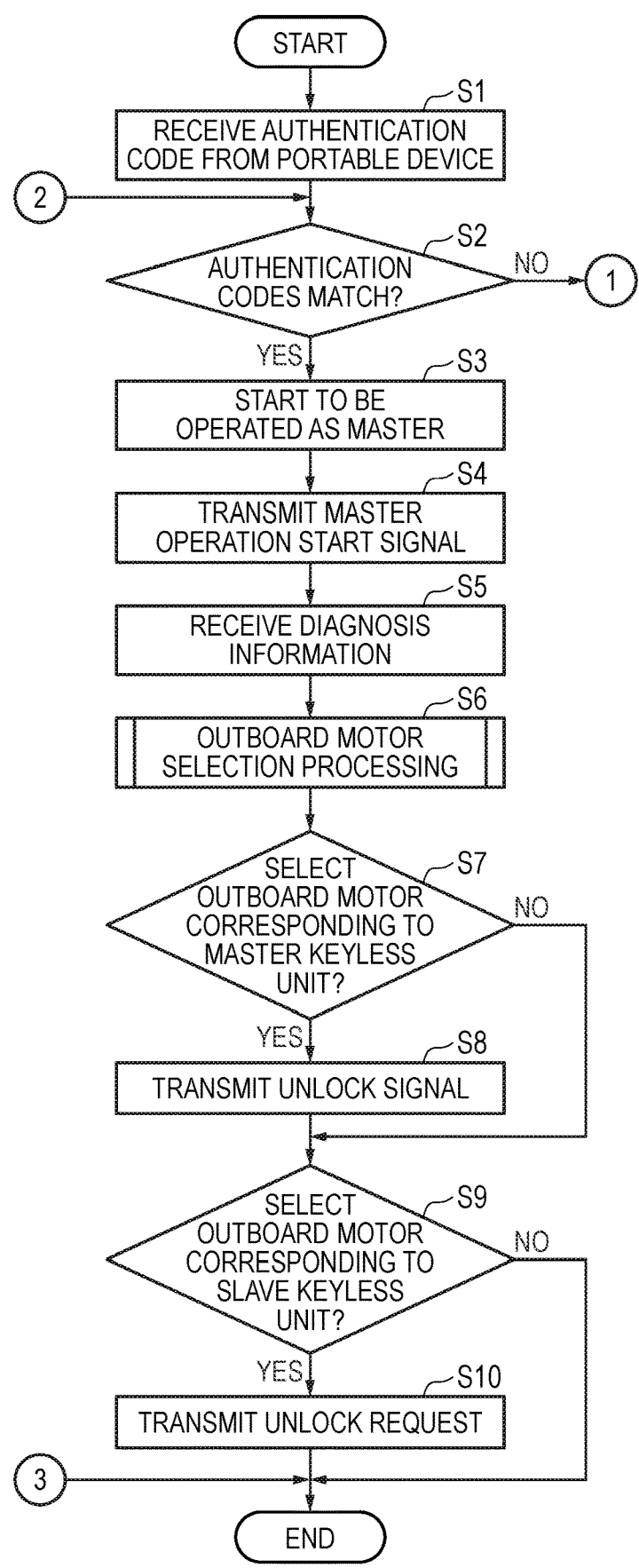
FIG. 4 is a flowchart showing an unlocking processing (mainly, a processing of a master keyless unit) in the ship propulsion system according to the first embodiment of the present invention.
Figure 5:
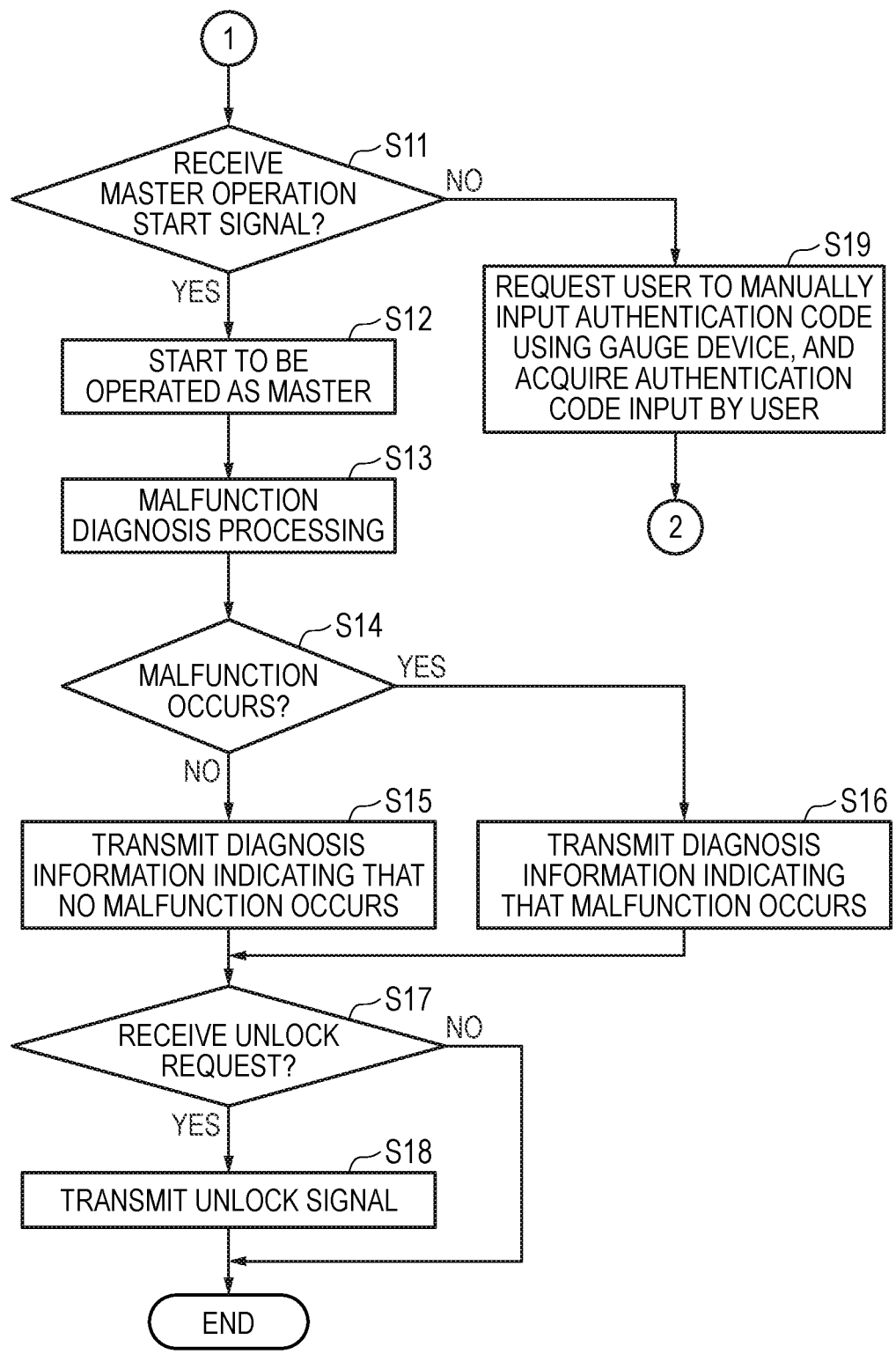
FIG. 5 is a flowchart showing an unlocking processing (mainly, a processing of a slave keyless unit) in the ship propulsion system according to the first embodiment of the present invention.
Figure 6:
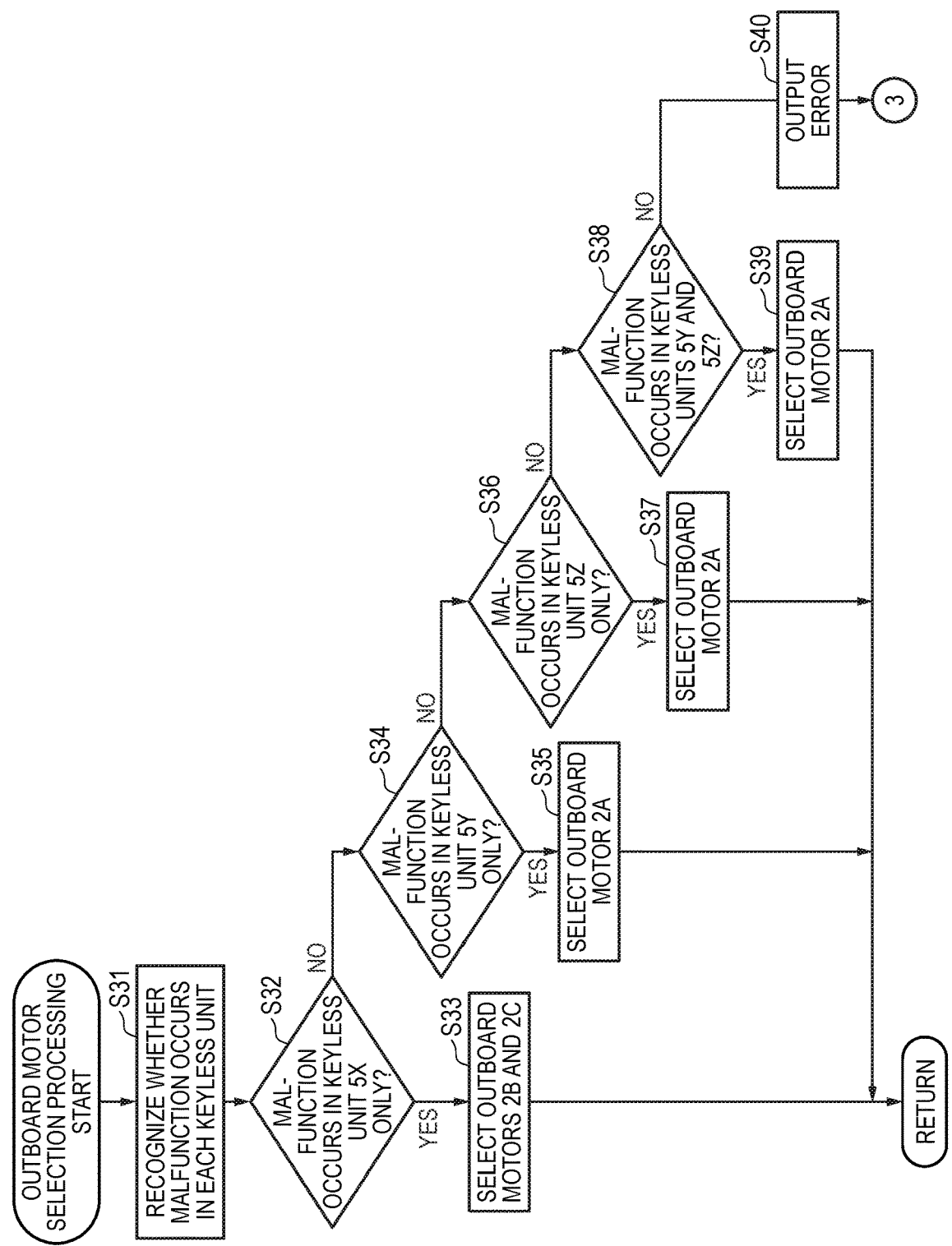
FIG. 6 is a flowchart showing an outboard motor selection processing in the ship propulsion system according to the first embodiment of the present invention.

FIGS. 4 to 6 show an unlocking processing of unlocking an outboard motor based on an authentication code transmitted from the portable device 4. The unlocking processing is executed immediately after a user presses the main switch 12 and turns on a power supply of a device provided in the ship 81, for example, when the user starts to use the ship 81. The unlocking processing is executed by each of the keyless units 5X, 5Y, and 5Z. Hereinafter, a case where the keyless unit 5X executes the unlocking processing will be described as an example.

The unlocking processing shown in FIGS. 4 to 6 includes an unlocking processing of a master keyless unit and an unlocking processing of a slave keyless unit. The processing shown in FIGS. 4 and 6 is mainly the unlocking processing of the master keyless unit, and the processing shown in FIG. 5 is mainly the unlocking processing of the slave keyless unit. Hereinafter, a case where the keyless unit 5X serves as a master keyless unit and executes an unlocking processing will be described first, and then a case where the keyless unit 5X serves as a slave keyless unit and executes an unlocking processing will be described.

Next, a case where the keyless unit 5X serves as a master keyless unit and executes an unlocking processing will be described. In FIG. 4, in a state in which a power supply of a device provided in the ship 81 is turned off, when a user carrying the portable device 4 boards the ship 81 and presses the main switch 12, the power supply of the device provided in the ship 81 is turned on. Since each of the keyless units 5X, 5Y, and 5Z is disposed in the vicinity of the cockpit, when the user is at a position where the user can press the main switch 12 provided in the cockpit, the portable device 4 carried by the user is positioned within a range where the portable device 4 can communicate with each of the keyless units 5X, 5Y, and 5Z.

Immediately after the power supply of the device provided in the ship 81 is turned on, for example, first, communication is established between the keyless unit 5X and the portable device 4, an authentication code is transmitted from the portable device 4 to the keyless unit 5X, and then the communication between the keyless unit 5X and the portable device 4 is cut off. Next, the same operation is sequentially performed between the keyless unit 5Y and the portable device 4 and between the keyless unit 5Z and the portable device 4. A series of such communication operations are executed, each of the keyless units 5X, 5Y, and 5Z receives the authentication code stored in the memory 29 of the portable device 4 (step S1).

Subsequently, the authenticator 33 of the keyless unit 5X determines whether the authentication code transmitted from the portable device 4 matches an authentication code stored in the memory 37 of the keyless unit 5X (step S2). When the authentication code stored in the memory 29 of the portable device 4 is the same as the authentication code stored in the memory 37 of the keyless unit 5X, the authentication code transmitted from the portable device 4 matches the authentication code stored in the memory 37 of the keyless unit 5X.

When the authentication code transmitted from the portable device 4 matches the authentication code stored in the memory 37 of the keyless unit 5X (step S2: YES), the master controller 34 of the keyless unit 5X operates the keyless unit 5X as a master keyless unit (step S3).

Subsequently, the master controller 34 of the keyless unit 5X transmits a master operation start signal to each of the keyless units 5Y and 5Z in order to notify the keyless units 5Y and 5Z that the keyless unit 5X is started to be operated as a master keyless unit (step S4). After the keyless unit 5Y and the keyless unit 5Z receives the master operation start signal, the keyless unit 5Y and the keyless unit 5Z start to be operated as slave keyless units.

Subsequently, the master controller 34 of the keyless unit 5X waits for transmission of diagnosis information from the keyless unit 5Y and transmission of diagnosis information from the keyless unit 5Z for a predetermined first standby time. That is, each of the keyless units 5Y and 5Z that are operated as the slave keyless units diagnoses whether a malfunction occurs in the keyless units 5Y and 5Z, and transmits diagnosis information indicating a diagnosis result to the keyless unit 5X that is operated as the master keyless unit. The master controller 34 of the keyless unit 5X waits for the transmission of the diagnosis information from each of the keyless units 5Y and 5Z for the first standby time. When diagnosis information is transmitted from the keyless unit 5Y within the first standby time, the master controller 34 of the keyless unit 5X receives the diagnosis information, and when diagnosis information is transmitted from the keyless unit 5Z within the first standby time, the master controller 34 of the keyless unit 5X receives the diagnosis information (step S5). Thereafter, the processing proceeds to step S6. However, the keyless unit 5Y or the keyless unit 5Z may not be able to transmit the diagnosis information to the keyless unit 5X due to a malfunction occurring in the keyless unit 5Y or the keyless unit 5Z. In a case where the master controller 34 of the keyless unit 5X cannot receive the diagnosis information from the keyless unit 5Y or the keyless unit 5Z even after the first standby time is elapsed, the master controller 34 of the keyless unit 5X does not wait for the diagnosis information any more, and the processing proceeds to step S6.

Subsequently, the master controller 34 of the keyless unit 5X executes an outboard motor selection processing (step S6). FIG. 6 shows specific contents of the outboard motor selection processing. In the outboard motor selection processing shown in FIG. 6, first, the master controller 34 of the keyless unit 5X recognizes whether a malfunction occurs in each of the keyless units 5X, 5Y, and 5Z (step S31). Specifically, when the master controller 34 of the keyless unit 5X receives the diagnosis information from the keyless unit 5Y, the master controller 34 determines whether a malfunction occurs in the keyless unit 5Y based on the diagnosis information. The diagnosis information received from the keyless unit 5Y indicates whether a malfunction occurs in the keyless unit 5Y. When the master controller 34 of the keyless unit 5X receives the diagnosis information indicating that a malfunction occurs in the keyless unit 5Y, the master controller 34 of the keyless unit 5X recognizes that a malfunction occurs in the keyless unit 5Y based on the diagnosis information. When the master controller 34 of the keyless unit 5X cannot receive the diagnosis information from the keyless unit 5Y, the master controller 34 of the keyless unit 5X also recognizes that a malfunction occurs in the keyless unit 5Y. On the other hand, when the master controller 34 of the keyless unit 5X receives the diagnosis information indicating that no malfunction occurs in the keyless unit 5Y from the keyless unit 5Y, the master controller 34 of the keyless unit 5X recognizes that no malfunction occurs in the keyless unit 5Y. Similarly, when the master controller 34 of the keyless unit 5X receives the diagnosis information indicating that a malfunction occurs in the keyless unit 5Z from the keyless unit 5Z, and when the master controller 34 of the keyless unit 5X cannot receive the diagnosis information from the keyless unit 5Z from the keyless unit 5Z, the master controller 34 of the keyless unit 5X recognizes that a malfunction occurs in the keyless unit 5Z. On the other hand, when the master controller 34 of the keyless unit 5X receives the diagnosis information indicating that no malfunction occurs in the keyless unit 5Z from the keyless unit 5Z, the master controller 34 of the keyless unit 5X recognizes that no malfunction occurs in the keyless unit 5Z. In addition, the master controller 34 of the keyless unit 5X recognizes that no malfunction occurs in the keyless unit 5X.

Subsequently, based on the recognition result in step S31, the master controller 34 of the keyless unit 5X selects an outboard motor that is disposed in a manner of being bilaterally symmetrical about the center of the ship 81 in the left-right direction from outboard motors corresponding to a keyless unit in which no malfunction occurs among the keyless units 5X, 5Y, and 5Z.

Specifically, as shown in steps S32 to S39 in FIG. 6, in a case where a malfunction occurs in the keyless unit 5A, the outboard motor 2A corresponding to the keyless unit 5X cannot be unlocked, and no malfunction occurs in the keyless unit 5Y and the keyless unit 5Z, the outboard motor 2B corresponding to the keyless unit 5Y and the outboard motor 2C corresponding to the keyless unit 5Z can be unlocked, the master controller 34 of the keyless unit 5A selects the outboard motor 2B corresponding to the keyless unit 5Y and the outboard motor 2C corresponding to the keyless unit 5Z. The outboard motor 2B is disposed at the left side of the ship 81, the outboard motor 2C is disposed at the right side of the ship 81, and the outboard motors 2B and 2C are disposed in a manner of being bilaterally symmetrical about the center of the ship 81 in the left-right direction.

In a case where a malfunction occurs in the keyless unit 5Y, the outboard motor 2B corresponding to the keyless unit 5Y cannot be unlocked, and no malfunction occurs in the keyless unit 5X and the keyless unit 5Z, the outboard motor 2A corresponding to the keyless unit 5X and the outboard motor 2C corresponding to the keyless unit 5Z can be unlocked, the master controller 34 of the keyless unit 5X selects only the outboard motor 2A corresponding to the keyless unit 5X. The outboard motor 2A is disposed at the center of the ship 81 in the left-right direction, and the arrangement of the outboard motor 2A is bilaterally symmetrical about the center of the ship 81 in the left-right direction.

In a case where a malfunction occurs in the keyless unit 5Z, the outboard motor 2C corresponding to the keyless unit 5Z cannot be unlocked, and no malfunction occurs in the keyless unit 5X and the keyless unit 5Y, the outboard motor 2A corresponding to the keyless unit 5X and the outboard motor 2B corresponding to the keyless unit 5Y can be unlocked, the master controller 34 of the keyless unit 5X selects only the outboard motor 2A corresponding to the keyless unit 5X.

In a case where a malfunction occurs in the keyless unit 5Y and the keyless unit 5Z, the outboard motor 2B corresponding to the keyless unit 5Y and the outboard motor 2C corresponding to the keyless unit 5Z cannot be unlocked, and no malfunction occurs in the keyless unit 5X, the outboard motor 2A corresponding to the keyless unit 5X can be unlocked, the master controller 34 of the keyless unit 5X selects only the outboard motor 2A corresponding to the keyless unit 5X.

In the present embodiment, the master controller 34 of the keyless unit 5X selects the outboard motors shown in steps S32 to S39 by using outboard motor selection information 38 set in advance and stored in the memory 37. FIG. 7 shows an example of the outboard motor selection information 38. For example, as shown in FIG. 7, the outboard motor selection information 38 is a table for describing a relationship between the outboard motors 2A, 2B, and 2C provided at the ship 81 and whether a malfunction occurs in the keyless units 5X, 5Y, and 5Z.

In the present embodiment, an error occurs in a case where a malfunction occurs in each of the keyless units 5X and 5Y, and the outboard motor 2A corresponding to the keyless unit 5X and the outboard motor 2B corresponding to the keyless unit 5Y cannot be unlocked, in a case where a malfunction occurs in each of the keyless units 5X and 5Z, and the outboard motor 2A corresponding to the keyless unit 5X and the outboard motor 2C corresponding to the keyless unit 5Z cannot be unlocked, or in a case where a malfunction occurs in each of the keyless units 5X, 5Y, and 5Z, and the outboard motor 2A corresponding to the keyless unit 5X, the outboard motor 2B corresponding to the keyless unit 5Y, and the outboard motor 2C corresponding to the keyless unit 5Z cannot be unlocked, and the unlocking processing is ended (step S40 in FIG. 6).

An outboard motor that is disposed in a manner of being bilaterally symmetrical about the center of the ship 81 in the left-right direction is selected by the outboard motor selection processing shown in FIG. 6 from outboard motors corresponding to a keyless unit in which no malfunction occurs among the keyless units 5X, 5Y, and 5Z, and then the processing proceeds to step S7 in FIG. 4. In step S7, when the master controller 34 of the keyless unit 5X selects the outboard motor 2A corresponding to the keyless unit 5X that is operated as a master keyless unit in the outboard motor selection processing, the master controller 34 of the keyless unit 5X transmits an unlock signal to the ECM 3P that controls the outboard motor 2A (steps S7 and S8). Accordingly, the outboard motor 2A is unlocked.

Subsequently, when the master controller 34 of the keyless unit 5X selects an outboard motor corresponding to a keyless unit that is operated as a slave keyless unit in the outboard motor selection processing, the master controller 34 of the keyless unit 5X transmits an unlock request to the slave keyless unit corresponding to the selected outboard motor (steps S9 and S10). Specifically, when the master controller 34 of the keyless unit 5X selects the outboard motor 2B corresponding to the keyless unit 5Y that is operated as a slave keyless unit in the outboard motor selection processing, the master controller 34 of the keyless unit 5X transmits an unlock request to the keyless unit 5Y. The keyless unit 5Y that received the unlock request transmits an unlock signal to the ECM 3Q that controls the outboard motor 2B. Accordingly, the outboard motor 2B is unlocked. When the master controller 34 of the keyless unit 5X selects the outboard motor 2C corresponding to the keyless unit 5Z that is operated as a slave keyless unit in the outboard motor selection processing, the master controller 34 of the keyless unit 5X transmits an unlock request to the keyless unit 5Z. The keyless unit 5Z that received the unlock request transmits an unlock signal to the ECM 3R that controls the outboard motor 2C. Accordingly, the outboard motor 2C is unlocked.

Next, a case where the keyless unit 5X serves and a slave keyless unit and executes an unlocking processing will be described. In FIG. 4, in a state in which a power supply of a device provided in the ship 81 is turned off, when a user carrying the portable device 4 boards the ship 81 and presses the main switch 12, the power supply of the device provided in the ship 81 is turned on. Immediately after the power supply of the device provided in the ship 81 is turned on, communication is performed between the portable device 4 and the keyless units 5X, 5Y, and 5Z, and each of the keyless units 5X, 5Y, and 5Z receives an authentication code transmitted from the portable device 4 (step S1). Subsequently, the authenticator 33 of the keyless unit 5X determines whether the authentication code transmitted from the portable device 4 matches the authentication code stored in the memory 37 of the keyless unit 5X (step S2).

When the authentication code transmitted from the portable device 4 does not match the authentication code stored in the memory 37 of the keyless unit 5X (step S2: NO), as shown in FIG. 5, the slave controller 35 of the keyless unit 5X waits for transmission of a master operation start signal from the keyless unit 5Y or the keyless unit 5Z for a predetermined second standby time (step S11). That is, when the authentication code stored in the memory 29 of the portable device 4 is the same as the authentication code stored in the memory 37 of the keyless unit 5Y, the keyless unit 5Y is operated as a master keyless unit. In this case, the master operation start signal is transmitted from the keyless unit 5Y. On the other hand, when the authentication code stored in the memory 29 of the portable device 4 is the same as the authentication code stored in the memory 37 of the keyless unit 5Z, the keyless unit 5Z is operated as a master keyless unit. In this case, the master operation start signal is transmitted from the keyless unit 5Z. The slave controller 35 of the keyless unit 5X waits for the transmission of the master operation start signal from a keyless unit that is operated as a master keyless unit between the keyless units 5Y and 5Z for the second standby time. When the master operation start signal is transmitted from the keyless unit that is operated as the master keyless unit within the second standby time, the slave controller 35 of the keyless unit 5X receives the master operation start signal.

When the controller 35 of the keyless unit 5X received the master operation start signal from the keyless unit 5Y or the keyless unit 5Z within the second standby time (step S11: YES), the slave controller 35 of the keyless unit 5X operates the keyless unit 5X as a slave keyless unit (step S12).

Subsequently, the slave controller 35 of the keyless unit 5X executes a malfunction diagnosis processing of diagnosing whether a malfunction occurs in the keyless unit 5X (step S13). For example, as the malfunction diagnosis processing, the slave controller 35 of the keyless unit 5X executes a communication test between the keyless unit 5X and the ECM 3P that controls the outboard motor 2A corresponding to the keyless unit 5X, and executes a processing of checking whether communication can be performed normally between the keyless unit 5X and the ECM 3P.

Subsequently, the slave controller 35 of the keyless unit 5X determines whether a malfunction occurs in the keyless unit 5X based on a result of the malfunction diagnosis processing in step S13 (step S14). When no malfunction occurs in the keyless unit 5X, the slave controller 35 of the keyless unit 5X transmits diagnosis information indicating that no malfunction occurs in the keyless unit 5X to the keyless unit that is operated as the master keyless unit between the keyless units 5Y and 5Z (step S15). On the other hand, when a malfunction occurs in the keyless unit 5X, the slave controller 35 of the keyless unit 5X transmits diagnosis information indicating that a malfunction occurs in the keyless unit 5X to the keyless unit that is operated as the master keyless unit between the keyless units 5Y and 5Z (step S16).

Subsequently, the slave controller 35 of the keyless unit 5X waits for transmission of an unlock request from the keyless unit that is operated as the master keyless unit between the keyless units 5Y and 5Z for a predetermined third standby time (step S17). That is, when a keyless unit that is operated as a master keyless unit selects an outboard motor corresponding to a keyless unit that is operated as a slave keyless unit in the outboard motor selection processing, the keyless unit that is operated as the master keyless unit transmits the unlock request to the slave keyless unit corresponding to the selected outboard motor. The slave controller 35 of the keyless unit 5X waits for the transmission of the unlock request from the keyless unit that is operated as the master keyless unit for the third standby time. When the unlock request is transmitted from the keyless unit that is operated as the master keyless unit within the third standby time, the slave controller 35 of the keyless unit 5X receives the unlock request. When the slave controller 35 of the keyless unit 5X received the unlock request, the slave controller 35 of the keyless unit 5X transmits an unlock signal to the ECM 3P that controls the outboard motor 2A corresponding to the keyless unit 5X (step S18). Accordingly, the outboard motor 2A is unlocked.

On the other hand, in step S11 in FIG. 5, when the master operation start signal cannot be received from either the keyless unit 5Y or the keyless unit 5Z within the second standby time, the slave controller 35 of the keyless unit 5X uses the gauge device 6 to request a user to manually input an authentication code, and executes a processing of acquiring the authentication code input by the user (step S19). That is, when the authentication code stored in the memory 29 of the portable device 4 is different from any one of the authentication codes stored in the memories 37 of the keyless units 5X, 5Y, and 5Z, none of the keyless units 5X, 5Y, and 5Z is operated as the master keyless unit. In this case, in step S11, the slave controller 35 of the keyless unit 5X does not receive a master start signal within the second standby time. In such a case, since the outboard motors 2A, 2B, 2C cannot be unlocked by the communication between the portable device 4 and the keyless units 5X, 5Y, 5Z, the user is given an opportunity to manually input an authentication code.

Specifically, the slave controller 35 of the keyless unit 5X transmits an instruction for executing an authentication code input processing to the gauge device 6 via the shared signal line 11. In this case, the slave controller 35 of each of the keyless units 5Y and 5Z also transmits the same instruction to the gauge device 6. The gauge device 6 displays an authentication code input screen on a display of the gauge device 6 in accordance with any one of these instructions. The user can input an authentication code by operating the operation button of the gauge device 6. The gauge device 6 transmits the authentication code input by the user to each of the keyless units 5X, 5Y, and 5Z via the shared signal line 11. Each of the keyless units 5X, 5Y, and 5Z receives the authentication code transmitted from the gauge device 6, and executes the processing in step S2 and subsequent steps in FIG. 4 by using the authentication code.

In an unlocking processing, when the user carries the portable device 4 that stores the same authentication code as the authentication code stored in the memory 37 of the keyless unit 5X and presses the main switch 12, the keyless unit 5X that is operated as a master keyless unit, and the keyless unit 5Y and the keyless unit 5Z are operated as slave keyless units. When the user carries the portable device 4 that stores the same authentication code as the authentication code stored in the memory 37 of the keyless unit 5Y and presses the main switch 12, the keyless unit 5Y is operated as a master keyless unit, and the keyless unit 5X and the keyless unit 5Z are operated as slave keyless units. When the user carries the portable device 4 that stores the same authentication code as the authentication code stored in the memory 37 of the keyless unit 5Z and presses the main switch 12, the keyless unit 5Z is operated as a master keyless unit, and the keyless unit 5X and the keyless unit 5Y are operated as slave keyless units. An operation of the keyless unit 5Y in a case where the keyless unit 5Y is operated as the master keyless unit and an operation of the keyless unit 5Y in a case where the keyless unit 5Y is operated as the slave keyless unit are respectively the same as an operation of the keyless unit 5X in a case where the keyless unit 5X is operated as the master keyless unit and an operation of the keyless unit 5X in a case where the keyless unit 5X is operated as the slave keyless unit. An operation of the keyless unit 5Z in a case where the keyless unit 5Z is operated as the master keyless unit and an operation of the keyless unit 5Z in a case where the keyless unit 5Z is operated as the slave keyless unit are respectively the same as the operation of the keyless unit 5X in a case where the keyless unit 5X is operated as the master keyless unit and the operation of the keyless unit 5X in a case where the keyless unit 5X is operated as the slave keyless unit.

As described above, the ship propulsion system 1 according to the first embodiment of the present invention recognizes whether a malfunction occurs in each keyless unit, selects an outboard motor that is disposed in a manner of being bilaterally symmetrical about the center of the ship 81 in the left-right direction from outboard motors corresponding to a keyless unit in which no malfunction occurs, and unlocks the selected outboard motor only. When the user presses the all-device start and stop switch 9 after the unlocking processing is completed, the engines 21 of all outboard motors that are unlocked among the outboard motors 2A, 2B, and 2C are started. In this case, since only the outboard motor that is disposed in a manner of being bilaterally symmetrical about the center of the ship 81 in the left-right direction is operated, a propulsive force of the ship 81 obtained from the operated outboard motor is balanced between the left and right sides of the ship 81.

For example, in a case where the outboard motor 2B disposed at the left side of the ship 81 cannot be unlocked due to a malfunction of the keyless unit 5Y, the ship propulsion system 1 can unlock the outboard motor 2A and the outboard motor 2C corresponding to the keyless unit 5X and the keyless unit 5Z in which no malfunction occurs, but the ship propulsion system 1 does not unlock the outboard motor 2C disposed at the right side of the ship 81 and only unlocks the outboard motor 2A disposed at the center of the ship 81 in the left-right direction. In this case, when the user presses the all-device start and stop switch 9 after the unlocking processing, only the engine 21 of the outboard motor 2A is started. As a result, a propulsive force of the ship 81 is obtained only from the outboard motor 2A disposed at the center of the ship 81 in the left-right direction, and thus the propulsive force is balanced between the left and right sides of the ship 81.

As described above, according to the ship propulsion system 1 in the present embodiment, even in a case where some of the outboard motors 2A, 2B, 2C cannot be unlocked due to a malfunction of some of the keyless units 5X, 5Y, and 5Z, (specifically, even in a case where only the outboard motor 2A cannot be unlocked due to a malfunction of the keyless unit 5X, a case where only the outboard motor 2B cannot be unlocked due to a malfunction of the keyless unit 5Y, a case where only the outboard motor 2C cannot be unlocked due to a malfunction of the keyless unit 5Z, or a case where the outboard motor 2B and the outboard motor 2C cannot be unlocked due to a malfunction of the keyless unit 5Y and the keyless unit 5Z), it is possible to generate a propulsive force of the ship that is balanced between the left and right sides. Therefore, even in a case where a malfunction occurs in some of the keyless units, the user can easily maneuver the ship 81, and for example, can maneuver the ship 81 to travel straight or turn to the left or the right by a usual operation.

According to the ship propulsion system 1 in the present embodiment, even when a malfunction occurs in some of the keyless units, some of the outboard motors 2A, 2B, and 2C can be operated to propel the ship 81, and redundancy of the ship propulsion system 1 can be improved.

Further, according to the ship propulsion system 1 in the present embodiment, since the master keyless unit is configured to initiatively execute a processing of recognizing a malfunction of each of the keyless units 5X, 5Y, and 5Z and selecting an outboard motor disposed in a manner of being bilaterally symmetrical about the center of the ship 81 in the left-right direction from outboard motors corresponding to a keyless unit in which no malfunction occurs, the outboard motor can be efficiently selected.

Further, according to the ship propulsion system 1 in the present embodiment, since the slave keyless unit is configured to diagnose a malfunction of the slave keyless unit and transmit diagnosis information indicating the diagnosis result to the master keyless unit, and the master keyless unit is configured to recognize whether a malfunction occurs in the slave keyless unit based on the diagnosis information transmitted from the slave keyless unit, whether a malfunction occurs in the slave keyless unit can be smoothly recognized.

Second Embodiment

Figure 8:
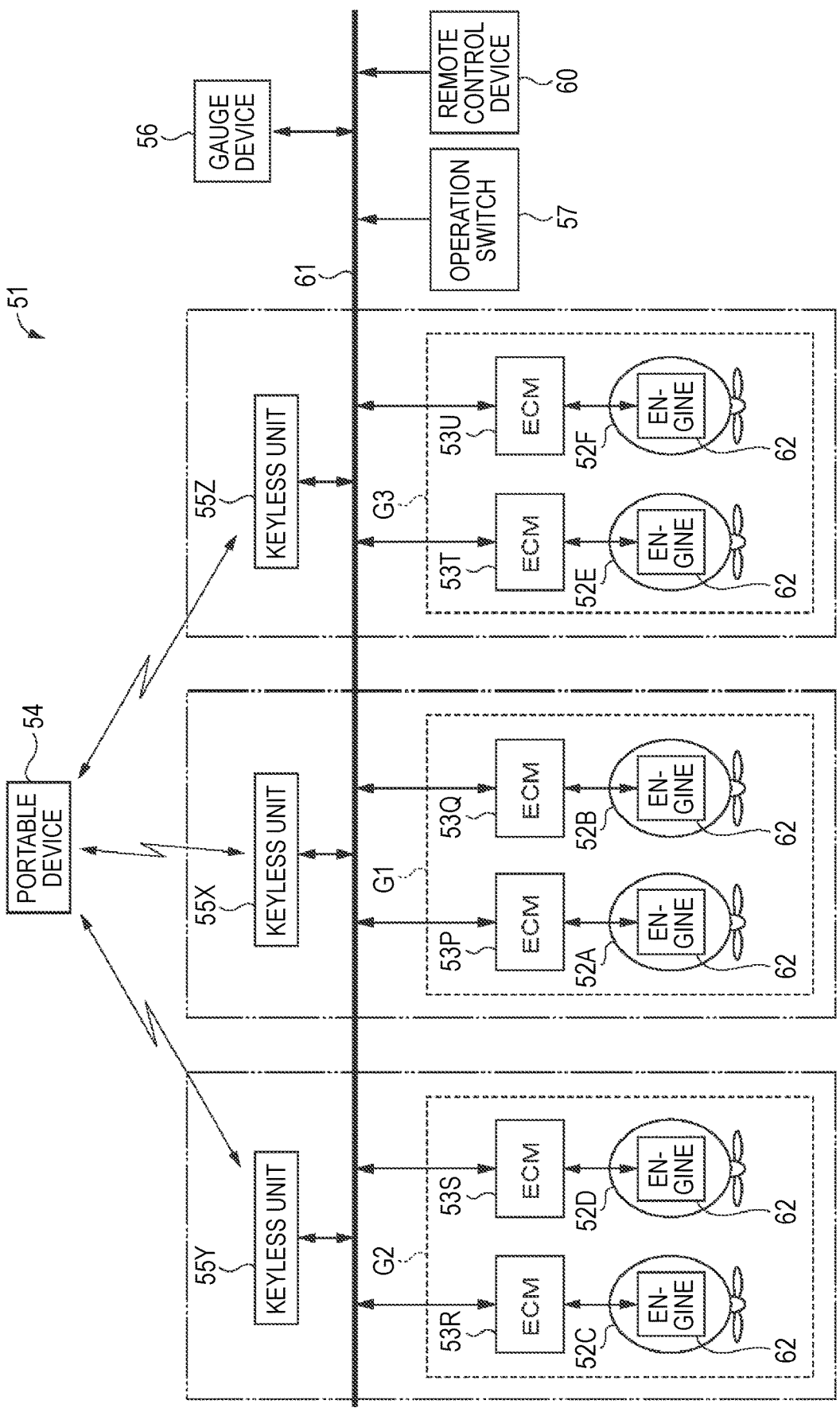
FIG. 8 is a block diagram showing a configuration of a ship propulsion system according to a second embodiment of the present invention.

FIG. 8 shows a configuration of a ship propulsion system 51 according to a second embodiment of the present invention. FIG. 9 shows an example of outboard motor selection information 63 used in the ship propulsion system 51. As shown in FIG. 8, the ship propulsion system 51 according to the second embodiment includes two outboard motors 52A and 52B belonging to a first group G1, two outboard motors 52C and 52D belonging to a second group G2, and two outboard motors 52E and 52F belonging to a third group G3. The outboard motors 52A and 52B are disposed in a central region of a ship in the left-right direction, the outboard motors 52C and 52D are disposed in a left region of the ship, and the outboard motors 52E and 52F are disposed in a right region of the ship. Performance related to an output of an engine 62 of each of the outboard motors 52A to 52F is the same.

The ship propulsion system 51 according to the second embodiment includes six ECMs 53P to 53U, and the six ECMs 53P to 53U respectively correspond to the six outboard motors 52A to 52F on a one-to-one basis. Similar to the ECMs 3P to 3R in the first embodiment, each of the ECMs 53P to 53U includes a controller, a CAN communicator, and a locking part.

The ship propulsion system 51 according to the second embodiment includes three keyless units 55X, 55Y, and 55Z. The keyless unit 55X corresponds to each of the outboard motors 52A and 52B that belong to the group G1. The keyless unit 55Y corresponds to each of the outboard motors 52C and 52D that belong to the group G2. The keyless unit 55Z corresponds to each of the outboard motors 52E and 52F that belong to the group G3.

The ship propulsion system 51 according to the second embodiment includes a portable device 54, a gauge device 56, an operation switch 57, and a remote controller 60. These devices respectively have the same configuration as the portable device 4, the gauge device 6, the operation switch 7, and the remote controller 10 in the first embodiment. Each device in the ship propulsion system 51 is connected to a shared signal line 61, and communication can be performed via the shared signal line 61.

Similar to the keyless units 5X, 5Y, and 5Z in the first embodiment, the keyless units 55X, 55Y, and 55Z have a master-slave function and an outboard motor selection function. Each of the keyless units 55X, 55Y, and 55Z executes an unlocking processing. Contents of the unlocking processing are the same as contents of the unlocking processing in the first embodiment as shown in FIGS. 4 and 5 except for an outboard motor selection processing.

Each of the keyless units 55X, 55Y, and 55Z executes the following processing as the outboard motor selection processing. Each of the keyless units 55X, 55Y, and 55Z executes the outboard motor selection processing based on the outboard motor selection information 63 shown in FIG. 9.

That is, in a case where a malfunction occurs in the keyless unit 55X, the two outboard motors 52A and 52B corresponding to the keyless unit 55X cannot be unlocked, and no malfunction occurs in the keyless unit 55Y and the keyless unit 55Z, the two outboard motors 52C and 52D corresponding to the keyless unit 55Y and the two outboard motors 52E and 52F corresponding to the keyless unit 55Z can be unlocked, a keyless unit that is operated as a master keyless unit among the keyless units 55X, 55Y, and 55Z selects the outboard motor 52C and the outboard motor 52D corresponding to the keyless unit 55Y and the outboard motor 52E and the outboard motor 52F corresponding to the keyless unit 55Z.

In a case where a malfunction occurs in the keyless unit 55Y, the two outboard motors 52C and 52D corresponding to the keyless unit 55Y cannot be unlocked, and no malfunction occurs in the keyless unit 55X and the keyless unit 55Z, the two outboard motors 52A and 52B corresponding to the keyless unit 55X and the two outboard motors 52E and 52F corresponding to the keyless unit 55Z can be unlocked, a keyless unit that is operated as a master keyless unit among the keyless units 55X, 55Y, and 55Z selects only the outboard motor 52A and the outboard motor 52B corresponding to the keyless unit 55X.

In a case where a malfunction occurs in the keyless unit 55Z, the two outboard motors 52E and 52F corresponding to the keyless unit 55Z cannot be unlocked, and no malfunction occurs in the keyless unit 55X and the keyless unit 55Y, the two outboard motors 52A and 52B corresponding to the keyless unit 55X and the two outboard motors 52C and 52D corresponding to the keyless unit 55Y can be unlocked, a keyless unit that is operated as a master keyless unit among the keyless units 55X, 55Y, and 55Z selects only the outboard motor 52A and the outboard motor 52B corresponding to the keyless unit 55X.

In a case where a malfunction occurs in the keyless unit 55Y and the keyless unit 55Z, the two outboard motors 52C and 52D corresponding to the keyless unit 55Y and the two outboard motors 52E and 52F corresponding to the keyless unit 55Z cannot be unlocked, and no malfunction occurs in the keyless unit 55X, the two outboard motors 52A and 52B corresponding to the keyless unit 55X can be unlocked, a keyless unit that is operated as a master keyless unit among the keyless units 55X, 55Y, and 55Z selects only the outboard motor 52A and the outboard motor 52B corresponding to the keyless unit 55X.

The ship propulsion system 51 according to the second embodiment of the present invention has the same effects as the ship propulsion system 1 according to the first embodiment of the present invention.

Although a case where the master keyless unit recognizes that no malfunction occurs in the master keyless unit without executing the malfunction diagnosis processing of diagnosing whether a malfunction occurs in the master keyless unit is described in the embodiments described above, the present invention is not limited thereto. The master keyless unit may perform a malfunction diagnosis processing for the master keyless unit and recognize whether a malfunction occurs in the master keyless unit based on a diagnosis result.

Figure 10:
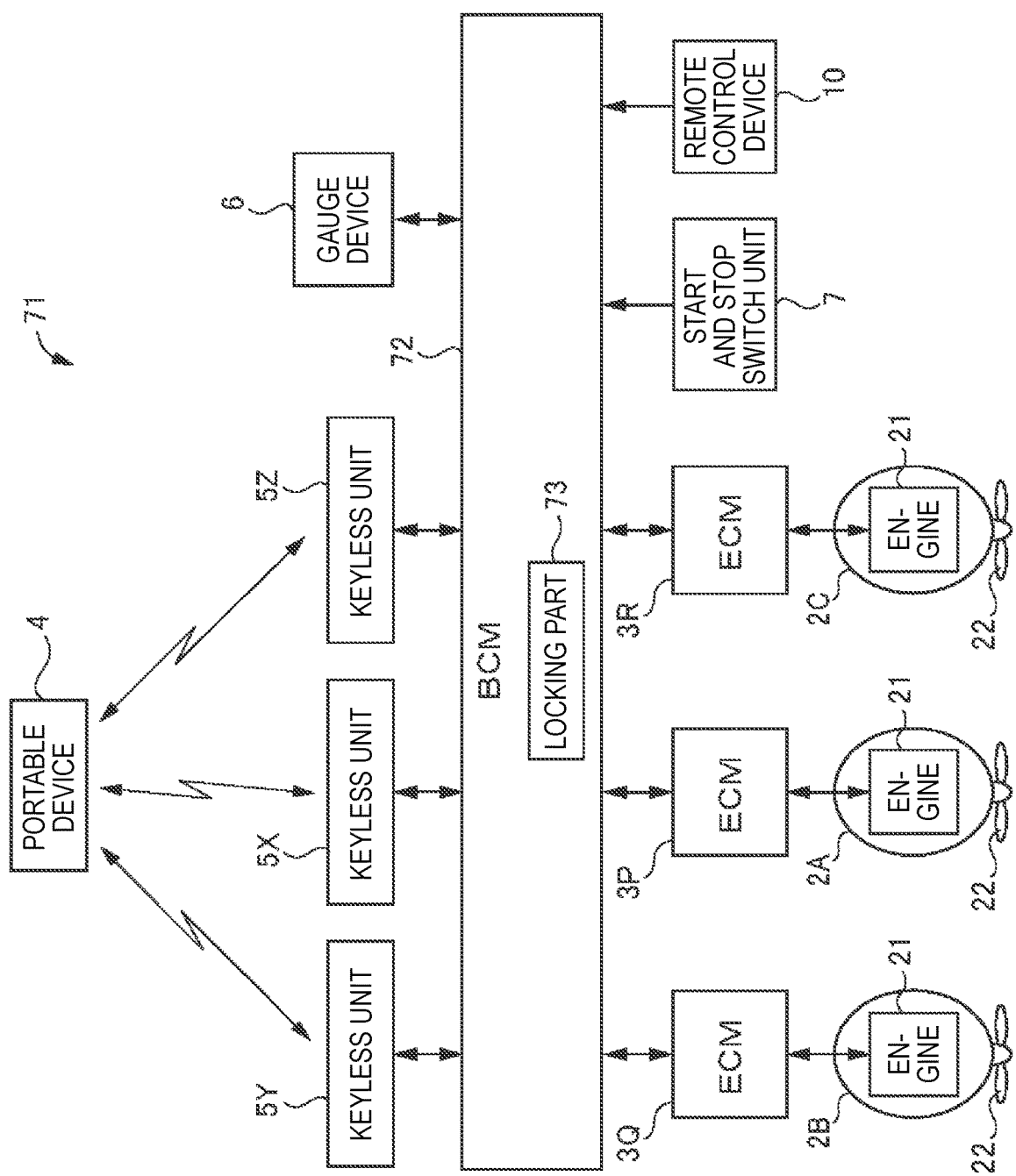
FIG. 10 is a block diagram showing a ship propulsion system according to another embodiment of the present invention.

Although a case where the ECMs 3P to 3Q (53P to 53U) each include the locking part 27 and unlock the outboard motors 2A to 2C (52A to 52F) is described as an example in the embodiments described above, the present invention is not limited thereto. For example, as in a ship propulsion system 71 shown in FIG. 10, a boat control module (BCM) 72 that integrally controls a plurality of outboard motors provided in a ship may be provided as a control device in the ship, and the BCM 72 may be provided with a locking part 73. In this case, the locking part 73 of the BCM 72 controls the outboard motor 2A via the ECM 3P and unlocks the outboard motor 2A in accordance with an unlock signal transmitted from the keyless unit 5X. The locking part 73 of the BCM 72 controls the outboard motor 2B via the ECM 3Q and unlocks the outboard motor 2B in accordance with an unlock signal transmitted from the keyless unit 5Y. The locking part 73 of the BCM 72 controls the outboard motor 2C via the ECM 3R and unlocks the outboard motor 2C in accordance with an unlock signal transmitted from the keyless unit 5Z.

Although a case where the engines 21 of all unlocked outboard motors are started all at once by the all-device start and stop switch 9 is described as an example in the embodiments described above, the main switch 12 may have a function of starting the engines 21 of all unlocked outboard motors all at once.

Although a case where three outboard motors 2A, 2B, and 2C correspond to three keyless units 5X, 5Y, and 5Z on a one-to-one basis is described as an example in the first embodiment, various correspondence relationships between three or more outboard motors and a plurality of keyless units may be considered in the ship propulsion system. For example, three outboard motors and two keyless units may be provided. One of the two keyless units may correspond to one of the three outboard motors disposed at the center of the ship in the left-right direction, and the other one of the two keyless units may correspond to the other two outboard motors respectively disposed at the left side and the right side of the ship among the three outboard motors.

For example, the correspondence relationship between the six outboard motors 52A to 52F and the three keyless units 55X, 55Y, and 55Z in the second embodiment may be modified as follows. That is, the keyless unit 55X may correspond to four outboard motors disposed in a central region in the left-right direction of the ship among the outboard motors 52A to 52F, the keyless unit 55Y may correspond to one outboard motor disposed at the leftmost side of the ship among the outboard motors 52A to 52F, and the keyless unit 55Z may correspond to one outboard motor disposed at the rightmost side of the ship among the outboard motors 52A to 52F.

The present invention can be applied to a case where the number of outboard motors provided in a ship is four, five, or seven or more. The number of keyless units in the present invention is not limited to three or two and may be four or more in a case where the number of outboard motors is large.

A communication method among the keyless units, the ECMs, the operation switch, the remote controller, and the gauge device is not limited to a CAN method. The power source of each outboard motor may be another type of a power source such as an electric motor. The present invention can be applied to a ship propulsion system including a ship propulsion device of a type other than an outboard motor. A type of a ship to which the present invention is applied is not limited.

The present invention can be modified as appropriate without departing from the scope or spirit of the invention which can be read from the claims and the entire specification, and the ship propulsion system to which such a change is applied is also included in the technical concept of the present invention.

What is claimed is:

1. A ship propulsion system comprising:
   a plurality of ship propulsion devices provided in a ship and configured to propel the ship;
   a control device configured to control the plurality of ship propulsion devices;
   a plurality of authentication devices that respectively stores different authentication codes; and
   a communication device storing one of the authentication codes respectively stored in the plurality of authentication devices and configured to transmit the one of the authentication codes to the plurality of authentication devices, wherein
   the plurality of ship propulsion devices include three or more ship propulsion devices,
   the plurality of ship propulsion devices are disposed in a manner of being bilaterally symmetrical about a center of the ship in a left-right direction,
   each of the plurality of authentication devices corresponds to one or more ship propulsion devices among the plurality of ship propulsion devices, two or more authentication devices among the plurality of authentication devices do not simultaneously correspond to one ship propulsion device of the plurality of ship propulsion devices, each of the plurality of authentication devices is configured to operate as a master authentication device when an authentication code transmitted from the communication device matches an authentication code stored in the plurality of authentication devices, the master authentication device is configured: to recognize whether a malfunction occurs in each of the plurality of authentication devices; and to select a ship propulsion device disposed in a manner of being bilaterally symmetrical about the center of the ship in the left-right direction from ship propulsion devices corresponding to an authentication device in which no malfunction occurs among the plurality of authentication devices, and the control device is configured to bring the ship propulsion device selected by the master authentication device into an operable state.

2. The ship propulsion system according to claim 1, wherein an authentication device that does not operate as the master authentication device among the plurality of authentication devices operates as a slave authentication device, when the ship propulsion device selected by the master authentication device corresponds to the master authentication device, the master authentication device outputs an unlock instruction for unlocking the ship propulsion device selected by the master authentication device to the control device, when the ship propulsion device selected by the master authentication device is a ship propulsion device corresponding to the slave authentication device, the master authentication device requests the slave authentication device corresponding to the ship propulsion device selected by the master authentication device to output the unlock instruction to the control device, the control device includes a locking part configured to lock each of the ship propulsion devices, and the locking part is configured to unlock the ship propulsion device selected by the master authentication device based on the unlock instruction being output from the master authentication device or the slave authentication device.

3. The ship propulsion system according to claim 1, wherein an authentication device that does not operate as the master authentication device among the plurality of authentication devices operates as a slave authentication device, the slave authentication device is configured: to execute a malfunction diagnosis processing of diagnosing whether a malfunction occurs in the slave authentication device; and to transmit a diagnosis result of the malfunction diagnosis processing to the master authentication device, and the master authentication device is configured to recognize whether a malfunction occurs in the slave authentication device based on the diagnosis result of the malfunction diagnosis processing transmitted from the slave authentication device.

4. The ship propulsion system according to claim 1, wherein the plurality of ship propulsion devices include a first ship propulsion device disposed at the center of the ship in the left-right direction, a second ship propulsion device disposed at a left side of the ship, and a third ship propulsion device disposed at a right side of the ship, the plurality of authentication devices include a first authentication device corresponding to the first ship propulsion device, a second authentication device corresponding to the second ship propulsion device, and a third authentication device corresponding to the third ship propulsion device, and when the master authentication device recognizes a malfunction of the second authentication device and does not recognize a malfunction of the first authentication device and a malfunction of the third authentication device, or when the master authentication device recognizes the malfunction of the third authentication device and does not recognize the malfunction of the first authentication device and the malfunction of the second authentication device, the master recognition device selects only the first ship propulsion device as a ship propulsion device to be brought into the operable state by the control device.

5. The ship propulsion system according to claim 1, wherein the plurality of ship propulsion devices include one or more ship propulsion devices belonging to a first group, one or more ship propulsion devices belonging to a second group, and one or more ship propulsion devices belonging to a third group, the one or more ship propulsion devices belonging to the first group is disposed in a central region of the ship in the left-right direction, the one or more ship propulsion devices belonging to the second group is disposed in a left region of the ship, and the one or more ship propulsion devices belonging to the third group is disposed in a right region of the ship, the plurality of authentication devices include a first authentication device corresponding to each of the ship propulsion devices belonging to the first group, a second authentication device corresponding to each of the ship propulsion devices belonging to the second group, and a third authentication device corresponding to each of the ship propulsion devices belonging to the third group, and when the master authentication device recognizes a malfunction of the second authentication device and does not recognize a malfunction of the first authentication device and a malfunction of the third authentication device, or when the master authentication device recognizes the malfunction of the third authentication device and does not recognize the malfunction of the first authentication device and the malfunction of the second authentication device, the master authentication device selects only the ship propulsion devices belonging to the first group as ship propulsion devices to be brought into an operable state by the control device.

* * * * *